United States Patent
Zhang et al.

(10) Patent No.: US 8,490,403 B2
(45) Date of Patent: Jul. 23, 2013

(54) SYSTEM AND METHOD FOR APPLYING ENERGY EXTERNALLY FOR FUEL GAS FOR DEW POINT HEATING IN GAS TURBINE POWER PLANT

(75) Inventors: Hua Zhang, Greenville, SC (US); Dean Erickson, Simpsonville, SC (US); David Wesley Ball, Jr., Easley, SC (US)

(73) Assignee: General Electric Company, Schenectady, NY (US)

( * ) Notice: Subject to any disclaimer, the term of this patent is extended or adjusted under 35 U.S.C. 154(b) by 987 days.

(21) Appl. No.: 12/556,153

(22) Filed: Sep. 9, 2009

(65) Prior Publication Data
US 2011/0056212 A1    Mar. 10, 2011

(51) Int. Cl.
*F02C 1/00*    (2006.01)
(52) U.S. Cl.
USPC .............................. 60/772; 60/736
(58) Field of Classification Search
USPC ................... 60/39.465, 734, 736, 786, 772
See application file for complete search history.

(56) References Cited

U.S. PATENT DOCUMENTS

| | | | | |
|---|---|---|---|---|
| 2,757,270 | A * | 7/1956 | Fairbanks | 219/535 |
| 2,783,613 | A * | 3/1957 | Von Zborowski | 60/736 |
| 3,263,732 | A * | 8/1966 | Eisenkraft | 431/264 |
| 3,271,951 | A * | 9/1966 | Nettel | 60/39.464 |
| 3,707,074 | A * | 12/1972 | Meyer et al. | 60/786 |
| 4,807,584 | A * | 2/1989 | Davis | 123/557 |
| 5,317,877 | A * | 6/1994 | Stuart | 60/736 |
| 5,423,174 | A * | 6/1995 | Mouton | 60/39.093 |
| 5,626,019 | A * | 5/1997 | Shimizu et al. | 60/728 |
| 6,578,532 | B1 * | 6/2003 | Rowley | 123/25 R |
| 8,020,387 | B2 * | 9/2011 | Prade | 60/772 |
| 2009/0049842 | A1 * | 2/2009 | Canham et al. | 60/796 |
| 2012/0153035 | A1 * | 6/2012 | Forsberg | 239/5 |

* cited by examiner

*Primary Examiner* — Phutthiwat Wongwian
(74) *Attorney, Agent, or Firm* — Nixon & Vanderhye P.C.

(57) ABSTRACT

In a gas turbine power plant, pressurized fuel gas undergoes pressure reduction and gas expansion before being provided to a gas turbine. Condensations, which can damage the turbine, can form as the fuel gas cools when the fuel gas undergoes the pressure reduction and expansion. An electric startup heater is used to superheat the fuel gas to substantially prevent the condensations from forming. The electric startup heater includes band heaters wrapped externally to a fuel gas pipe to heat the fuel gas from outside in. Compared to conventional heaters which provide superheating through internal heating elements, the electric startup heater reduces costs and provides increased safety, flexibility, operational efficiency and ability to adapt to varying fuel gas characteristics.

20 Claims, 6 Drawing Sheets

SYSTEM AND METHOD FOR APPLYING ENERGY EXTERNALLY FOR FUEL GAS FOR DEW POINT HEATING IN GAS TURBINE POWER PLANT

This invention relates to system and method for superheating fuel gas prior to delivery of the fuel gas to a gas turbine.

BACKGROUND

Figure 1:
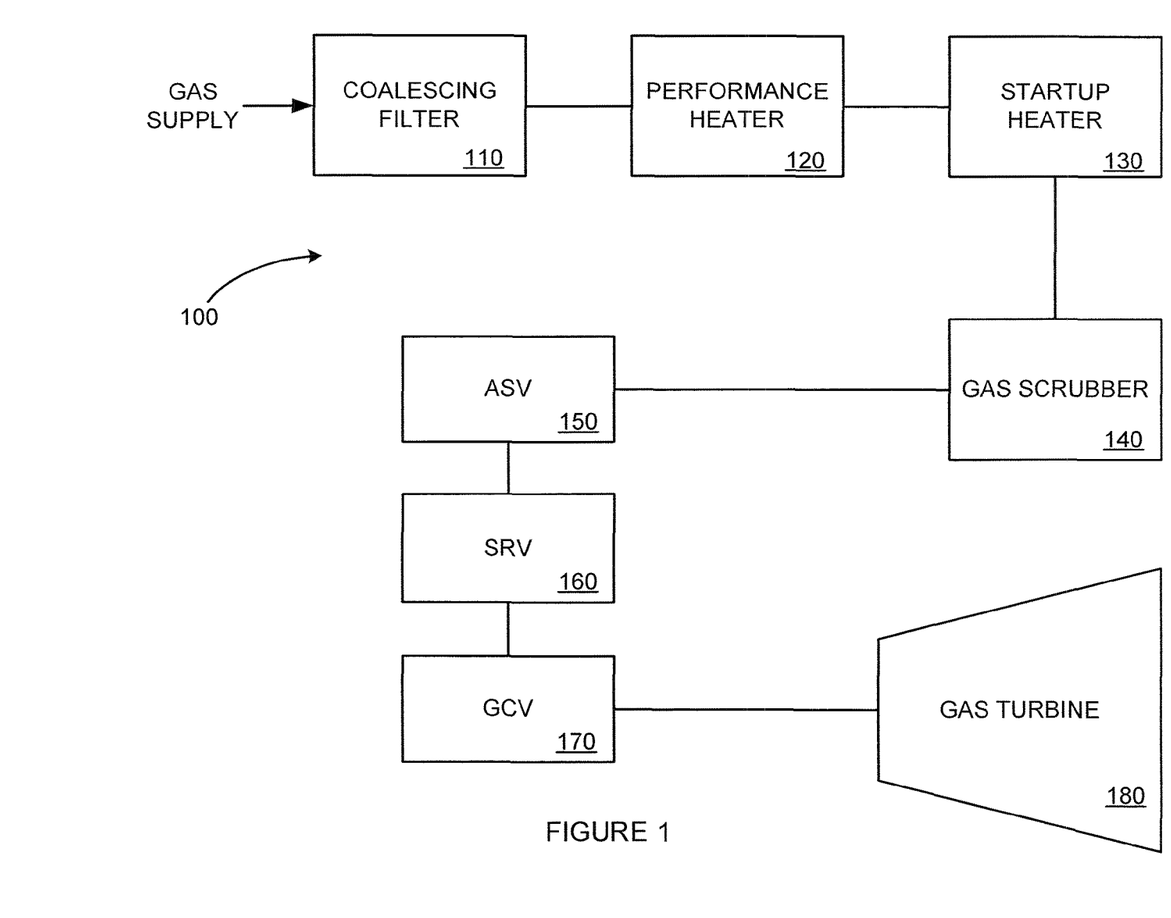
FIG. 1 is a block diagram of a conventional gas turbine power plant.

Fuel in gaseous form is widely used for power plants. FIG. 1 illustrates a simplified view of a gas turbine power plant 100. The plant 100 includes a coalescing filter 110, a performance heater 120, a startup heater 130, a gas scrubber 140, and various valves including ASV (auxiliary stop valve) 150, SRV (speed ratio valve) 160, and GCV (gas control valve) 170, and a gas turbine 180.

For operational and safety reasons, fuel gas delivered to the gas turbine should be free of liquids such as moisture from water and hydrocarbon liquids. Moisture is undesirable since it can combine with hydrocarbons such as methane to form solid hydrates which can damage the turbine. Hydrocarbon liquids are of particular concern since they can lead to undesirable situations such as uncontrolled heat addition, gas turbine over speed, auto ignition, flash back and re-ignitions among others.

The fuel gas supplied to the power plant is normally pressurized and undergoes pressure reduction and expansion as the fuel gas flows through the valves 150, 160, 170 before being provided to the turbine 180. Gas cooling, also referred to as the Joule-Thomson effect, occurs as a result of this pressure reduction and gas expansion. If substantial cooling occurs, water and liquid hydrocarbon condensation can form presenting risks as described above.

To avoid condensation from forming, the fuel gas is superheated upstream of the valves 150, 160, 170. That is, the fuel gas is heated sufficiently above the moisture and hydrocarbon dew points. By superheating the fuel gas upstream, condensation is prevented downstream when the fuel gas is depressurized and expanded as the gas flows through the valves 150, 160, 170. This ensures that the only the fuel in gaseous form is provided to the inlet of the gas turbine 180.

As illustrated in FIG. 1, two types of heaters—the performance heater 120 and the startup heater 130—are typically used to superheat the fuel gas. During normal operation, the performance heater 120 uses hot water as a heat source to superheat the fuel gas. The hot water is provided from a heat recovery steam generator (HSRG) (not shown in FIG. 1) which in turn uses the hot exhaust from the gas turbine 180 to heat the water.

Figure 2:
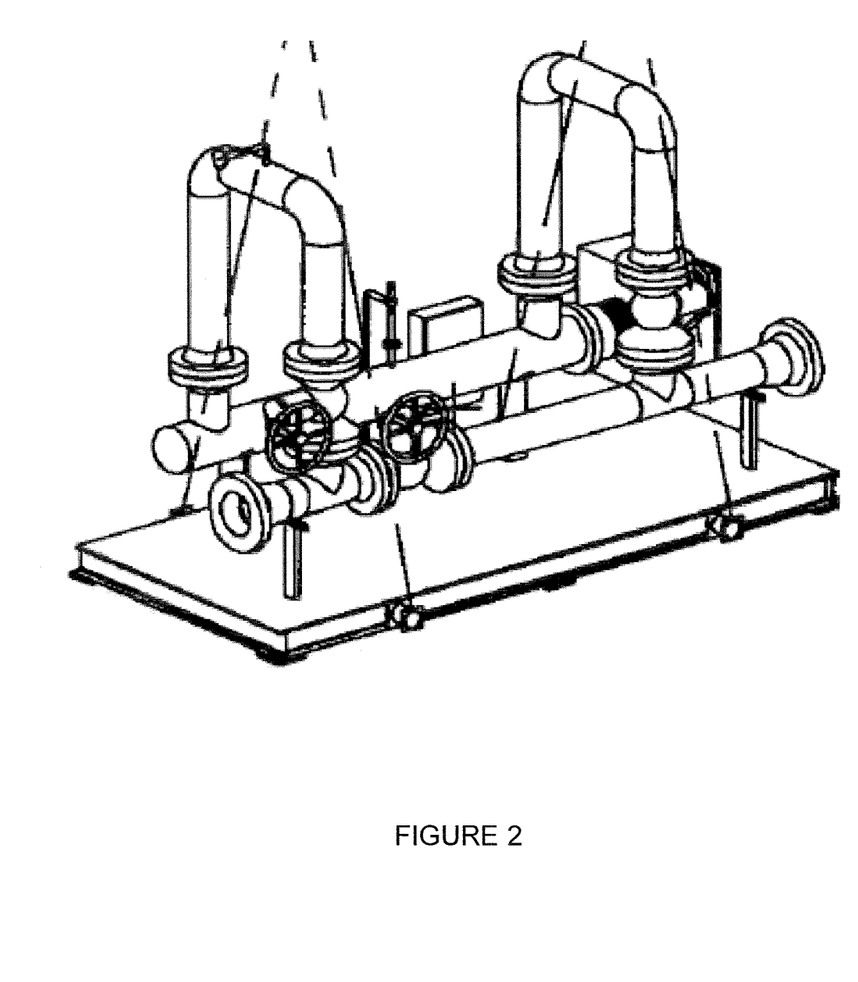
FIG. 2 a view of a conventional startup heater.

When the gas turbine 180 is in startup operation, hot water from the HSRG is not yet available. Until the gas turbine 180 reaches normal operation, the startup heater 130 provides the necessary superheating. Electric heaters are typically used due to their relative simplicity and convenience. An external view of a conventional electric startup heater is illustrated in FIG. 2. The conventional startup heater can be very sizable even for a plant that generates a modest amount of power. As an example, the skid for the conventional startup heater can be as big as 15 ft (length)×8 ft (width)×12 ft (height) for a gas turbine power plant with 0.28 megawatt generating capacity.

In the conventional electric startup heater, the active heating elements are mounted inside the piping (not shown) where the fuel gas flows. This allows for high heat transfer to take place so that the fuel gas temperature can be elevated quickly.

It will be appreciated that the conventional electric startup heater is prone to safety issues due to the heating elements being in direct contact with the fuel gas. Since the heating elements are in the path of the fuel gas flow, the heating elements themselves add to an undesirable pressure drop. Service and upgrade is made difficult due to the internal placement of the heating elements, which require valves, gaskets, and other fixtures so that the pipes containing the heating elements can be isolated for the service and upgrade. Operationally, it may be required that the fuel gas be flowing while the heating elements are on to reduce the possibility of heating element failure. Also, the conventional electric startup heater is very expensive—one system can be in excess of $265,000. There remains a need therefore, for system(s) and/or method(s) for superheating the fuel gas during system startup that reduces, if not eliminates, the disadvantages associated with the conventional electric startup heater.

BRIEF SUMMARY OF THE INVENTION

An exemplary, non-limiting aspect of the present invention relates to an electric startup heater for a gas turbine power plant. The exemplary startup heater includes a fuel gas pipe structured to allow fuel gas to flow therethrough, and one or more electric band heaters wrapped externally to and in contact with the fuel gas pipe. The band heaters are structured to superheat the fuel gas flowing through the fuel gas pipe. Superheating may be viewed as elevating the temperature of the fuel gas flowing in the fuel gas pipe sufficiently so as to substantially prevent condensation from forming when the fuel gas undergoes expansion downstream of the fuel gas pipe.

In accordance with another non-limiting aspect, the present invention relates to a gas turbine power plant that includes a fuel gas supply structured to supply fuel gas to a gas turbine and includes a gas fuel module located downstream of the fuel gas supply and upstream of the gas turbine. The gas fuel module is structured to control delivery of the fuel gas to the gas turbine. The power plant also includes an electric startup heater structured to superheat the fuel gas and located downstream of the fuel gas supply and upstream of the gas fuel module. The electric startup heater comprises a fuel gas pipe structured to allow the fuel gas from said fuel gas supply to flow therethrough towards the gas fuel module, and includes one or more electric band heaters wrapped externally to and in contact with the fuel gas pipe. The electric band heaters are structured to superheat the fuel gas flowing through the fuel gas pipe to elevate the temperature of the fuel gas upstream of the gas fuel module sufficiently to substantially prevent condensation from forming when the fuel gas undergoes expansion as the fuel gas flows through the gas fuel module.

In accordance with a further non-limiting aspect, the present invention relates to a method of operating a gas turbine power plant which comprises a gas fuel module located upstream of a gas turbine and an electric startup heater located downstream of a gas supply and immediately upstream of said gas fuel module. The electric startup heater comprises a fuel gas pipe and one or more electric band heaters wrapped externally to and in contact with the fuel gas pipe. The electric startup heater is also free of active heating elements internally within the fuel gas pipe. In the method, the fuel gas from the gas supply is superheated using the electric startup heater in which the temperature of the fuel gas is elevated sufficiently to substantially prevent condensation from forming when the fuel gas undergoes expansion as the gas flows through the gas fuel module. The method also includes controlling the delivery of the superheated fuel gas from the electric startup heater to the gas turbine using the gas fuel module.

The invention will now be described in greater detail in connection with the drawings identified below.

DETAILED DESCRIPTION OF THE INVENTION

As explained above, the fuel gas is superheated to prevent condensations from forming as the fuel gas expands through the valves before being provided to the gas turbine. When the power plant is in startup operation, the startup heater provides the necessary superheating. Superheating the fuel gas about 50° F. above the moisture dew point or the hydrocarbon dew point (whichever is greater) is usually sufficient. Some gas turbines do have some amount of tolerance to the presence of condensation. Thus, superheating maybe viewed as elevating the fuel gas temperature to substantially prevent the condensations from forming. Of course, complete or near-complete prevention is most desirable.

One or more non-limiting embodiments of the electric startup heater employ a new heating concept. In these embodiments), active heating elements are placed outside of the fuel gas flow and heat is transferred from outside in. The heating elements can be relatively simple, high performance electric band heaters that are wrapped around a piping through which the fuel gas flows.

For heat transfer efficiency, the band heaters are preferred to be in contact with the outer surface of the piping. The band heaters can be formed from heating elements that are sandwiched between a material that is electrically insulate and thermally conductive. This results in the band heaters having a small mass, which means that the band heaters themselves can heat up quickly, for example, in less than two minutes for the band heaters and the piping. This in turn enables the heating section of the piping to quickly reach the target temperature.

The heating section may only require a slightly greater piping length (about 18 ft) as compared to the conventional heater that is about 15 ft long. The footprint requirement will not be much greater than the conventional electric startup heater. Indeed, the footprint is actually likely to be considerably less if a higher heat flux is considered. A very significant advantage of one or more exemplary electric startup heaters of the invention is that the heater can be seamlessly integrated into existing piping line because it does not require additional width for the fuel gas pipes. Further, existing controls can be used to control the electric startup heater embodiment(s).

Figure 3A:
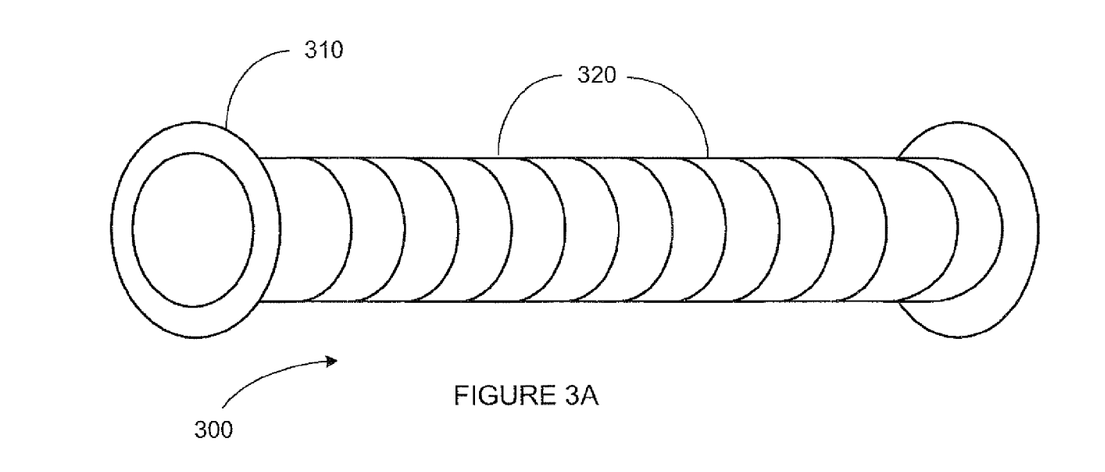
FIG. 3A is a perspective view of an exemplary non-limiting embodiment of an electric startup heater.

FIGS. 3A-3D illustrate an exemplary non-limiting embodiment of an electric startup heater 300. As illustrated in FIG. 3A, the electric startup heater 300 includes a fuel gas pipe 310 through which the fuel gas flows. One or more electric band heaters 320 are wrapped externally to the fuel gas pipe 310. The band heaters 320 are preferably in intimate contact with the fuel gas pipe to maximize heat transfer.

Figure 3B:
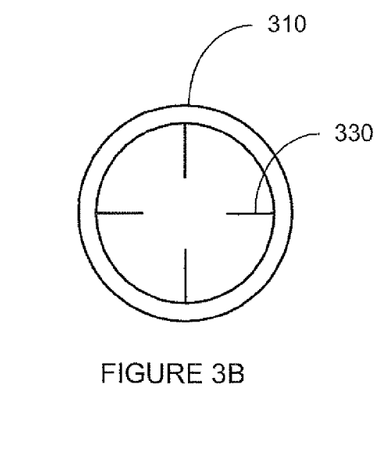
FIGS. 3B, 3C and 3D are non-limiting exemplary cross-sectional views of the electric startup heater.
Figure 3C:
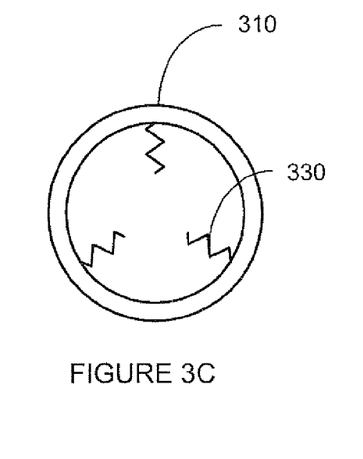
Figure 3D:
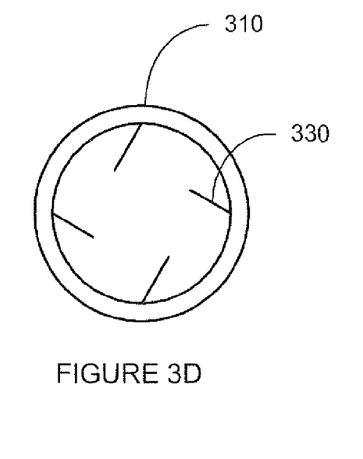

FIGS. 3B, 3C and 3D illustrate exemplary non-limiting cross-sectional views of the interior of the fuel gas pipe 310. As illustrated, the pipe 310 can be provided with one or more fins 330 to further promote heat transfer from the band heaters 320 to the fuel gas. As seen, the fins 330 project from the internal wall of the gas pipe 310. Preferably, the fins 330 are made as thin as possible to minimize fuel flow disturbance. To increase the surface area for heat transfer, the fins can extend in a longitudinal direction (into the page for FIGS. 3B, 3C and 3D) along at least a portion of the length of the pipe 310.

The fins 330 can be shaped in a variety of ways to increase the surface area. For example, the fins 330 are zigzag shaped in FIG. 3C. The number of fins 330 is not limited to any particular number. Further, the fins 330 need not always be oriented directly toward the center of the pipe 310—that is, the fins 330 may be angled as illustrated in FIG. 3D. The particular orientation of the projection and shape of the fins can be determined based on various design considerations and requirements such as an amount of surface area necessary to effectuate heat transfer. The fins 330 can be made integral with the pipe 310 or can be formed of other materials in consideration of factors such as heat transfer characteristics, resistance to deformation, costs, etc.

Fins 330 can be very beneficial in that the required target temperature of the fuel pipe 310 can be reduced. For example, for a 20 ft length fuel gas pipe 310 to superheat fuel gas flowing at a 9 lb/sec flow rate, it may be necessary to raise the temperature of the pipe 310 without fins 330 to nearly 500° F. to provide adequate heat transfer. With fins 330, the pipe 310's target temperature may be lowered to 400° F. and still provide adequate heat transfer. In other words, the pipe 310 with fins 330 may reach the target temperature sooner and the operations can be safer due to the lower piping temperature.

While not shown, it is contemplated that in addition to the external band heaters, active heating elements also be provided internally within the fuel gas pipe 310. Together, the band heaters 320 and the internal heating elements can rapidly elevate the fuel gas temperature.

However, it is more preferred that the fuel gas pipe 310 be free of internal heating elements. As noted above, the internal heating elements can contribute to a significant pressure drop since they normally cannot be shaped like the fins 330. Also, servicing the internal elements is difficult due to the internal placements. Further, valves, gaskets and fixtures would be required to isolate the gas pipe 310 to enable servicing.

Gas pipes free of active internal heating elements would be less complicated, easier to maintain, less costly and require less space. In addition, no valves, gaskets or fixtures would be required since there would be no need to access the internal heating elements. Servicing the band heaters 320 is comparatively simple since they are located externally and thus, are easily accessible.

Configuration of the exemplary electric startup heater 300 has important advantages. One significant example is as noted above, the heater can be seamlessly integrated into existing piping line because it does not require additional width for the fuel gas pipes. Thus, an existing pipe can be retrofitted to function as the startup heater by wrapping the electric band heaters around the existing pipe. Also, because the band heaters are compact, pipes with curves and/or bends (not shown) can be configured to serve as the startup heater. This represents a significant flexibility for locating the startup heater when space is at a premium.

Figure 4:
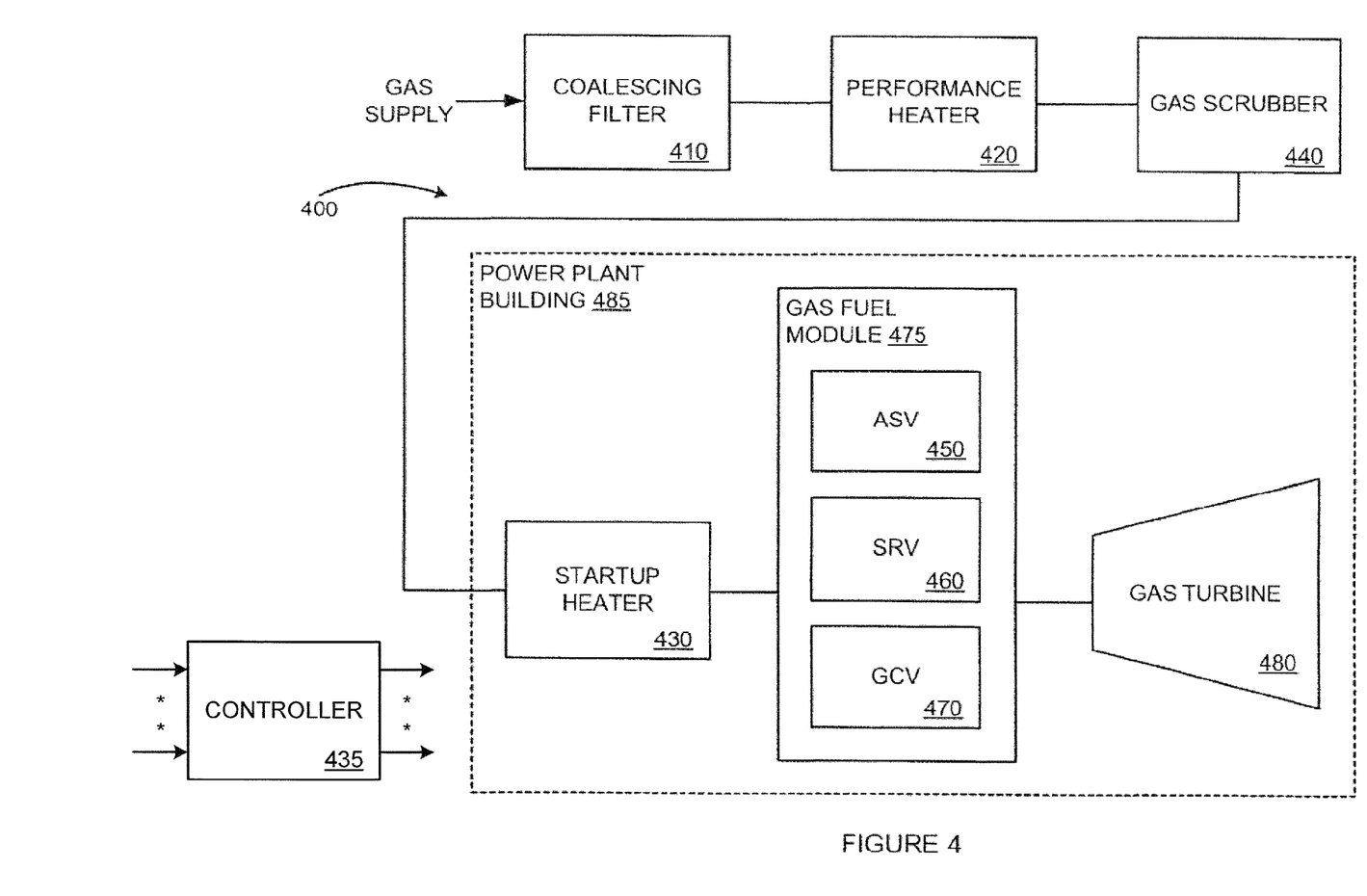
FIG. 4 is a block diagram of an exemplary non-limiting embodiment of a gas turbine power plant.

The exemplary electric startup heater can be a part of a gas turbine power plant 400 as illustrated in FIG. 4. In the figure, the power plant 400 includes a coalescing filter 410, a performance heater 420, a startup heater 430, a gas scrubber 440, an ASV 450, an SRV 460, a GCV 470, and a gas turbine 480. The valves 450, 460, 470 can be housed together in a gas fuel module 475 and structured to control delivery of the fuel gas from the gas supply to the turbine 480. The gas fuel module is located upstream of the gas turbine 480 and downstream of the fuel gas supply.

The electric startup heater 430 is located downstream of the fuel gas supply and upstream of the gas fuel module 475. For operational efficiency, it is desirable to locate the startup heater 430 as close to the gas turbine 480 as possible. In FIG. 4, the startup heater 430 is located immediately upstream of the gas fuel module 475.

The gas turbine 480 and the gas fuel module 475 are often located in a building structure such as a power plant building 485 in FIG. 4. To enable the startup heater 430 to be located close to the gas turbine 480, it is also desirable to co-locate the startup heater 430 within the same power plant building 485. Co-locating the conventional electric startup heater in the same building structure as the gas turbine would be difficult and/or ill-advised. The sheer size of the conventional heater makes co-locating problematic. But perhaps more importantly, the conventional startup heater requires valves, gaskets, and other fixtures as previously described. Valves, gaskets, or fixtures are sources of potential fuel leaks, which present safety issues if the conventional heater is co-located. But the exemplary startup heater 430 does not require valves, gaskets, and fittings, which greatly diminishes fuel leak concerns. This in turn allows the startup heater 430 to be co-located in the same power plant building 485, and thus, located close to the gas turbine 480.

In FIG. 4, the performance heater 420, located downstream of the gas supply and upstream of the startup heater 430, can be used to superheat the fuel gas during normal operation much like the conventional power plant illustrated in FIG. 1.

But under some circumstances, the performance heater 420 maybe unable to provide sufficient superheating. For example, the gas turbine 480 maybe required to operate with different types fuel gas such as natural and synthetic gases. Even for natural gas, it is well-known that natural gas is not homogenous, i.e., the gas is not constant with time or with geography. There can be significant variations in composition (e.g., proportion of methane, ethane, propane, etc) and properties of the natural gas supplied to the power plant 400. These variations imply that the dew points of the fuel gas can vary as well. Thus, depending on the characteristics of the fuel gas supplied to the power plant 400, it may be that the performance heater 420 cannot provide (or is otherwise not economical to provide) sufficient superheating. As another example, the performance heater 420 may be operational, but not at full capacity such as when a part of the performance heater 420 is shut down for maintenance or repair.

Thus, in a non-limiting aspect, the electric startup heater 430 is used to supplement, i.e., provide additional heating during normal operation, to ensure that the fuel gas is sufficiently superheated prior to being provided to the gas turbine 480. The electric startup heater 430 includes a controller 435 (drawn separately to minimize clutter) which controls the operation of the startup heater 430.

The startup heater 430 can also be used to provide a fine level of supplemental heating based on environmental and/or fuel gas characteristics to optimize the power plant operation. For example, sensors can be used to monitor the amount of heat added by the performance heater 420, the fuel gas flow rate, the fuel gas characteristics, and so on, and the controller 435 can finely control the supplemental heat based on the monitoring result. Such fine-tuning of fuel temperature can be integrated into a control loop to lower NOx and CO emission to meet regulatory requirements.

Figure 5:
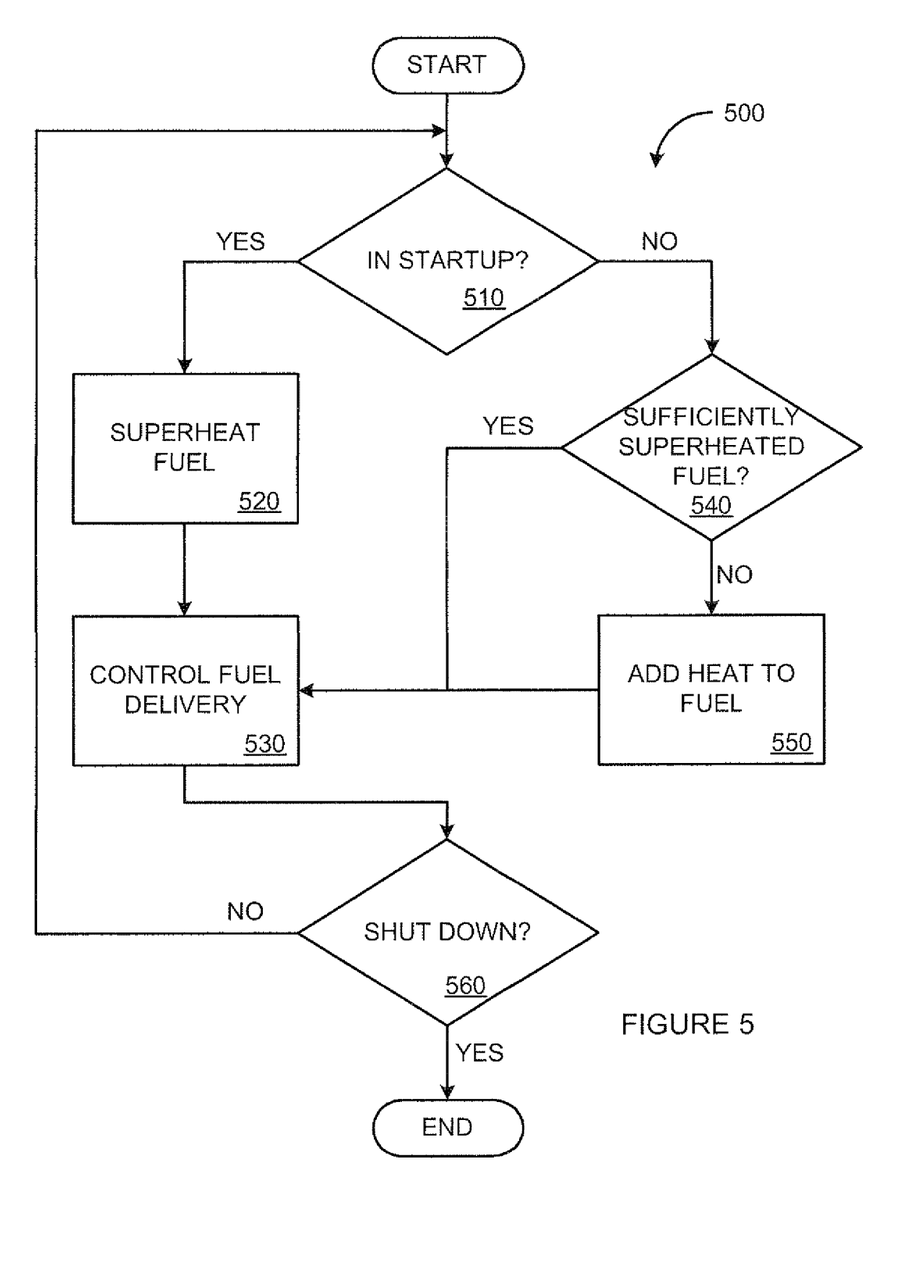
FIGS. 5 and 6 are flow diagrams of exemplary non-limiting methods of operating a gas turbine power plant.

FIG. 5 illustrates an example non-limiting method 500 of operating a gas turbine power plant such as the plant illustrated in FIG. 4. In step 510, the electric startup heater (e.g., the controller of the startup heater) determines whether the power plant is in startup mode. If so, the startup heater superheats the fuel gas in step 520, and the gas fuel module controls the delivery of the superheated fuel gas to the gas turbine in step 530.

If the startup heater determines that the power plant is not in startup mode (i.e., the plant is in normal operation mode), the startup heater then determines whether superheating from the performance heater is sufficient in step 540. When it determines that the superheating is not sufficient, the startup heater provides supplemental heating in step 550 to ensure sufficient superheating. The method then goes to step 530 after the fuel gas is sufficiently superheated (either after step 540 or 550). The operation continues until it is determined that the plant is to be shutdown in step 560.

Note that distinguishing whether or not the power plant is in startup or normal operation mode is a convenience mechanism and is not strictly necessary from the perspective of the startup heater. From this perspective, it is only necessary that sufficiently superheated fuel gas be provided to the gas fuel module.

Figure 6:
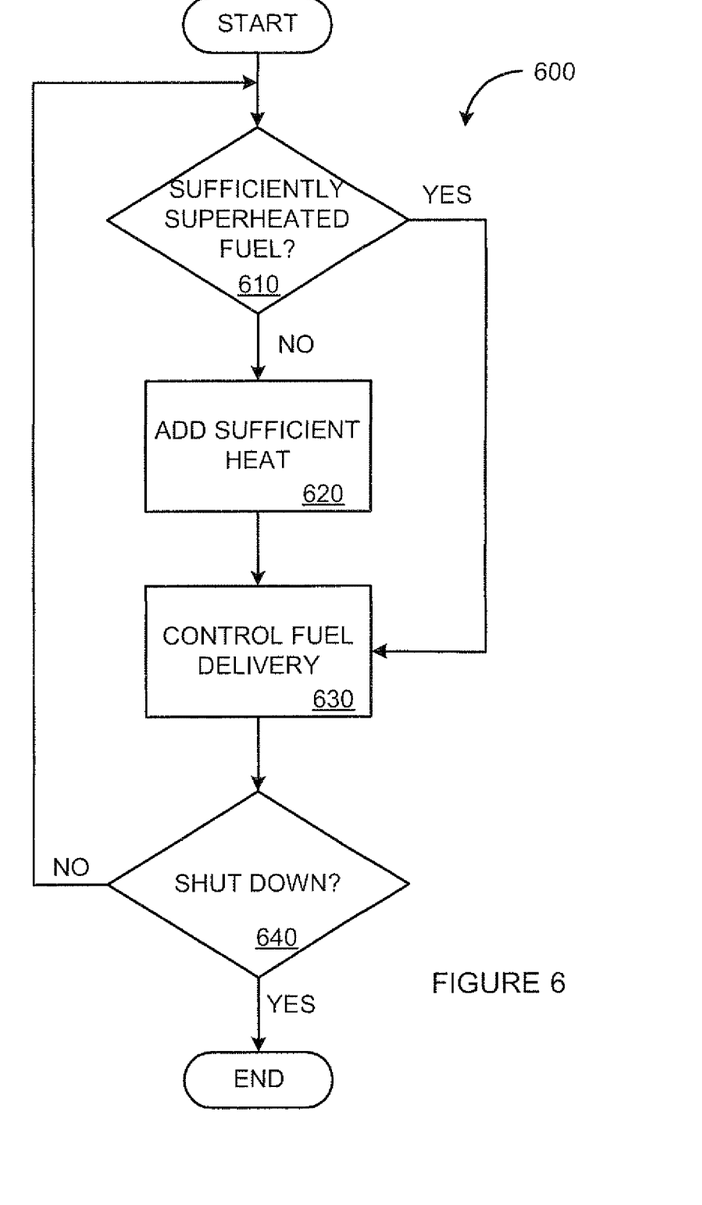

This is demonstrated in FIG. 6, which illustrates another example non-limiting method 600 to operate the power plant. In step 610, the startup heater determines whether the fuel gas flowing through the fuel gas pipe is sufficiently superheated. If not, it adds sufficient superheat in step 620. Insufficient superheating can occur, for example, whenever the performance heater is not operating at all, not operating at full capacity, or the fuel gas itself requires more heat than that can be provided by the performance heater even under full capacity. The gas fuel module controls the delivery of the superheated fuel gas to the gas turbine in step 630 (either after step 610 or 620). The superheating operation continues until it is determined that the plant is to be shutdown in step 640.

It will thus be appreciated that the non-limiting exemplary electric startup heater and the gas turbine power plant that includes the startup heater provides many advantages. A non-exhaustive list of such advantages include: reduced expense, ability to retrofit existing piping, locating the startup heater closer to the gas turbine, co-locating the start heater and the gas turbine in the same building structure, easier maintenance and upgrade, relative simplicity (e.g., no valves and fixtures required), reduced space requirements, and reduced pressure drop and increased safety (e.g., heating elements not in direct path of fuel flow).

While the invention has been described in connection with what is presently considered to be the most practical and preferred embodiment, it is to be understood that the invention is not to be limited to the disclosed embodiment. For example, the use of the exemplary electric startup heater is not limited to gas turbine power plants. The startup heater can be used in many fuel systems in which heating, not just superheating, the fuel gas would be advantageous. The invention is intended to cover various modifications and equivalent arrangements included within the spirit and scope of the appended claims.

What is claimed is:

1. An electric startup heater for a gas turbine power plant, comprising:
   a fuel gas pipe structured to allow fuel gas to flow therethrough;

one or more electric band heaters wrapped externally to and in contact with said fuel gas pipe, said one or more electric band heaters structured to superheat said fuel gas flowing through said fuel gas pipe; and controller of red to determine whether said power plant is in a startup mode, and to control said heaters to superheat said fuel gas in said startup mode, wherein superheating is defined as elevating temperature of said fuel gas sufficiently so as to substantially prevent condensation from forming when said fuel gas undergoes expansion downstream of said fuel gas pipe.

2. The electric startup heater of claim 1, further comprising:

one or more fins provided internally within said fuel gas pipe, said one or more fins structured to promote heat transfer of heat from said one or more band heaters to said fuel gas flowing through said fuel gas pipe.

3. The electric startup heater of claim 2, wherein said one or more fins extend substantially in a longitudinal direction of said fuel gas pipe.

4. The electric startup heater of claim 2, wherein said one or more fins are integrally formed with said fuel gas pipe.

5. The electric startup heater of claim 1, wherein said fuel gas pipe is free of active internal heating elements.

6. The electric startup heater of claim 1, wherein said fuel gas pipe includes one or more curves and/or one or more bends.

7. A gas turbine power plant, comprising:

a fuel gas supply structured to supply fuel gas to a gas turbine;

a gas fuel module located upstream of said gas turbine and downstream of said fuel gas supply, said gas fuel module structured to control delivery of said fuel gas from said fuel gas supply to said gas turbine; and an electric startup heater located downstream of said fuel gas supply and upstream of said gas fuel module, wherein said electric startup heater comprises:

a fuel gas pipe structured to allow said fuel gas from said fuel gas supply to flow therethrough towards said gas fuel module;

one or more electric band heaters wrapped externally to and in contact with said fuel gas pipe, said one or more electric band heaters structured to superheat said fuel gas flowing through said fuel gas pipe; and a controller configured to determine whether said power plant is in a startup mode, and to control said heaters to superheat said fuel gas in said startup mode, and wherein superheating is defined as elevating temperature of said fuel gas upstream of said gas fuel module sufficiently so as to substantially prevent condensation from forming when said fuel gas undergoes expansion as said fuel gas flows through said gas fuel module.

8. The gas turbine power plant of claim 7, wherein said electric startup heater is located immediately upstream of said gas fuel module.

9. The gas turbine power plant of claim 8, wherein said electric startup heater is co-located inside a power plant building in which said gas turbine and said gas fuel module are located.

10. The gas turbine power plant of claim 7, wherein said electric startup heater further comprises:

one or more fins provided internally within said fuel gas pipe, said one or more fins structured to promote heat transfer of heat from said one or more band heaters to said fuel gas flowing through said fuel gas pipe.

11. The gas turbine power plant of claim 7, wherein no valves and fixtures are provided to isolate said fuel gas pipe of said electric startup heater.

12. The gas turbine power plant of claim 7, further comprising:

a performance heater located downstream of said fuel gas supply and upstream of said electric startup heater, said performance heater structured to superheat said fuel gas flowing therethrough.

13. The gas turbine power plant of claim 12, wherein said performance heater is structured to superheat said fuel gas during normal operation of said power plant.

14. The gas turbine power plant of claim 13, wherein said electric startup heater is structured to provide additional heat to said fuel gas during said normal operation of said power plant.

15. The gas turbine power plant of claim 14, wherein said controller is configured to control said electric startup heater so as to control said additional heat provided based on any combination of fuel gas type, fuel gas composition, fuel gas properties, amount of heat added by said performance heater, operational status of said performance heater, fuel gas flow rate, and fuel gas characteristics.

16. The gas turbine power plant of claim 7, wherein said fuel gas pipe of said electric startup heater includes one or more curves and/or one or more bends.

17. A method of operating a gas turbine power plant which comprises a gas fuel module located upstream of a gas turbine and an electric startup heater located downstream of a gas supply and immediately upstream of said gas fuel module, said electric startup heater comprising a fuel gas pipe and one or more electric band heaters wrapped externally to and in contact with said fuel gas pipe, said electric startup heater also being free of active heating elements internally within said fuel gas pipe, said method comprising:

superheating, using said electric startup heater in a startup mode, fuel gas from said gas supply flowing through said fuel gas pipe so as to elevate temperature of said fuel gas sufficiently to substantially prevent condensation from forming when said fuel gas undergoes expansion as said fuel gas flows through said gas fuel module; and controlling, using said gas fuel module, a delivery of said superheated fuel gas from said electric startup heater to said gas turbine.

18. The method of operating said gas turbine power plant of claim 17, further comprising:

providing, using said electric startup heater, supplemental heat to said fuel gas which has been superheated by a performance heater located upstream of said electric startup heater when said superheat provided by said performance heater is insufficient to substantially prevent said condensation from forming.

19. The method of operating said gas turbine power plant of claim 18, wherein said electric startup heater performs said step of providing said supplemental heat when said power plant is in a normal operation mode.

20. The method of operating said gas turbine power plant of claim 18, wherein said step of providing said supplemental heat comprises:

controlling, using said electric startup heater, said supplement heat provided based on any combination of fuel gas type, fuel gas composition, fuel gas properties, amount of heat added by said performance heater, operational status of said performance heater, fuel gas flow rate, and fuel gas characteristics.

* * * * *

UNITED STATES PATENT AND TRADEMARK OFFICE
CERTIFICATE OF CORRECTION

PATENT NO. : 8,490,403 B2  
APPLICATION NO. : 12/556153  
DATED : July 23, 2013  
INVENTOR(S) : Hua Zhang et al.

Page 1 of 1

It is certified that error appears in the above-identified patent and that said Letters Patent is hereby corrected as shown below:

In the Claims:

In Claim 1 at column 7, line 5, delete "controller of red" and insert --a controller configured--

Signed and Sealed this  
Third Day of September, 2013

Teresa Stanek Rea  
*Acting Director of the United States Patent and Trademark Office*